United States Patent
Reckzeh et al.

(10) Patent No.: US 7,520,471 B2
(45) Date of Patent: Apr. 21, 2009

(54) AIRCRAFT WING, METHOD FOR OPERATING AN AIRCRAFT WING, AND USE OF A PIVOTABLE TRAILING EDGE ON A MAIN WING OF AN AIRCRAFT, FOR ADJUSTING THE SHAPE AND WIDTH OF AN AIR GAP

(75) Inventors: Daniel Reckzeh, Stuhr (DE); Adrian R. Dyke, Bristol (GB)

(73) Assignee: Airbus Deutschland GmbH, Hamburg (DE)

( * ) Notice: Subject to any disclaimer, the term of this patent is extended or adjusted under 35 U.S.C. 154(b) by 137 days.

(21) Appl. No.: 11/246,859

(22) Filed: Oct. 7, 2005

(65) Prior Publication Data
US 2006/0202089 A1    Sep. 14, 2006

Related U.S. Application Data

(60) Provisional application No. 60/618,051, filed on Oct. 11, 2004.

(30) Foreign Application Priority Data
Oct. 11, 2004    (DE)    ............ 10 2004 049 504

(51) Int. Cl.
*B64C 3/50* (2006.01)
*B64C 9/00* (2006.01)
(52) U.S. Cl. .................................. 244/215
(58) Field of Classification Search ........... 244/213, 244/215–217
See application file for complete search history.

(56) References Cited

U.S. PATENT DOCUMENTS

| | | | |
|---|---|---|---|
| 3,126,173 A * | 3/1964 | Alvarez-Calderon | 244/216 |
| 3,131,873 A * | 5/1964 | Sanders | 244/12.3 |
| 3,767,140 A | 10/1973 | Johnson | |
| 3,874,617 A | 4/1975 | Johnson | |
| 4,015,787 A | 4/1977 | Maieli et al. | |
| 4,120,470 A * | 10/1978 | Whitener | 244/213 |
| 4,181,275 A * | 1/1980 | Moelter et al. | 244/213 |

(Continued)

FOREIGN PATENT DOCUMENTS

DE    3821401 C1    1/1988

(Continued)

OTHER PUBLICATIONS

Peter K.C. Rudolph, High-Lift Systems on Commercial Subsonic Airlines, NASA Contractor Report 4746, Sep. 1996 Moffett Field, California.

*Primary Examiner*—Michael Carone
*Assistant Examiner*—Joseph W Sanderson
(74) *Attorney, Agent, or Firm*—Christopher Paradies; Fowler White Boggs P.A.

(57) ABSTRACT

An aircraft wing comprises a main wing with a pivotable trailing edge and a lift-assisting flap on the rear of the wing. The lift-assisting flap is coupled to the main wing and is designed in such a way that in its retracted state, the lift-assisting flap abuts the main wing and in an extended state, the lift-assisting flap forms an air gap with the main wing. The pivotable trailing edge is pivotable in such a way that, by pivoting the pivotable trailing edge, the shape and the width of the air gap are adjustable.

14 Claims, 5 Drawing Sheets

U.S. PATENT DOCUMENTS

| | | | | |
|---|---|---|---|---|
| 4,248,395 | A * | 2/1981 | Cole | 244/216 |
| 4,444,368 | A | 4/1984 | Andrews | |
| 4,705,236 | A * | 11/1987 | Rudolph | 244/90 R |
| 4,784,355 | A | 11/1988 | Brine | |
| 5,094,412 | A | 3/1992 | Narramore | |
| 5,294,080 | A * | 3/1994 | Ross | 244/215 |
| 5,564,655 | A * | 10/1996 | Garland et al. | 244/216 |
| 5,655,737 | A * | 8/1997 | Williams et al. | 244/212 |
| 5,735,485 | A * | 4/1998 | Ciprian et al. | 244/113 |
| 5,836,550 | A * | 11/1998 | Paez | 244/214 |
| 5,887,828 | A * | 3/1999 | Appa | 244/215 |
| 5,992,792 | A * | 11/1999 | Arnason | 244/13 |
| 6,076,775 | A * | 6/2000 | Bauer | 244/212 |
| 6,276,641 | B1 * | 8/2001 | Gruenewald et al. | 244/213 |
| 6,328,265 | B1 * | 12/2001 | Dizdarevic | 244/213 |
| 6,375,127 | B1 * | 4/2002 | Appa | 244/215 |
| 6,382,562 | B1 * | 5/2002 | Whitlock et al. | 244/118.3 |
| 6,464,176 | B2 * | 10/2002 | Uchida et al. | 244/216 |
| 6,644,599 | B2 * | 11/2003 | Perez | 244/219 |
| 6,729,583 | B2 * | 5/2004 | Milliere | 244/213 |

FOREIGN PATENT DOCUMENTS

| | | |
|---|---|---|
| FR | 728528 | 7/1932 |
| FR | 2756540 A1 | 6/1998 |

* cited by examiner

AIRCRAFT WING, METHOD FOR OPERATING AN AIRCRAFT WING, AND USE OF A PIVOTABLE TRAILING EDGE ON A MAIN WING OF AN AIRCRAFT, FOR ADJUSTING THE SHAPE AND WIDTH OF AN AIR GAP

RELATED APPLICATIONS

This application claims the benefit of the filing date of U.S. Provisional Patent Application No. 60/618,051 filed Oct. 11, 2004, and of German Patent Application No. 10 2004 049 504 filed Oct. 11, 2004, the disclosures of which are hereby incorporated by reference herein.

FIELD OF THE INVENTION

The invention relates to an aircraft wing, a method for operating an aircraft wing, and the use of a pivotable trailing edge on a main wing of an aircraft, for adjusting the shape and the width of an air gap.

TECHNOLOGICAL BACKGROUND

An aircraft is kept airborne by the aerodynamic lift of its wings.

An aircraft wing comprises a main wing, and in many cases also lift-assisting devices fixed to said wing. A lift-assisting device is a device on a wing of an aircraft, which device positively changes the lift coefficient at least in a range of the flight spectrum.

Lift assisting devices are in particular used during landing and during takeoff of an aircraft. The aim is, as a result of the increased lift, to reduce the take-off speed or landing speed and thus reduce the distance required for take-off or landing.

Lift-assisting devices may be affixed to the leading edge or the trailing edge of an aircraft wing. The so-called Fowler flap is an important example of a lift-assisting device affixed to the trailing edge of a wing. A Fowler flap is a control surface which is moved to the rear below the trailing edge of the wing and is set at an angle. In this way an air gap may be formed between the top and the bottom of the wing, as a result of which the airfoil curvature is increased. At the same time the wing surface is also increased.

FIG. 1 shows a retracted state 100 and an extended state 110 of a Fowler flap 102 affixed to the trailing edge of a main wing 101. In the retracted state 100 the Fowler flap 102 abuts the main wing 101. In order to move the Fowler flap 102 from the retracted state 100 to an extended state 110, the Fowler flap 102 is first moved to the rear and then folded downward. In this way an air gap 111 is created between the main wing 101 and the extended Fowler flap 102. As shown in FIG. 1, the Fowler flap 102 is attached to the trailing edge 103 of the main wing 101.

A Fowler flap which may be extended to form an air gap jointly with a main wing is known. See Rudolph, P "High-Lift Systems on Commercial Subsonic Airliners", NASA Contractor Report 4746, section 1.1.2. To achieve good flow characteristics with a Fowler flap it is important that the size of the air gap created when the flap is extended be well defined, and that a divergent air gap over the entire region of the Fowler flap be prevented.

This requirement may be met by various kinematic solutions. According to the state of the art, the so-called track and rear-link solution (for example implemented in the Airbus A340) or the 4-bar linkage solution (for example implemented in the Boeing 777) is used. See Rudolph, P "High-Lift Systems on Commercial Subsonic Airliners", NASA Contractor Report 4746, section 1.2.2.

Pivot point kinematics (pivot point or dropped hinge), according to which the flap is extended along a circular path is used in the Boeing C17. An example of the Fowler flap 200 is shown in FIG. 2. The Fowler flap 200 is brought along a circular direction of extension 201, starting from a retracted state 100 to an extended state 110.

Track and rear link kinematics shows good performance in relation to aerodynamic characteristics. Pivot point kinematics provide advantages in relation to the complexity of the system, which also results in reduced weight.

However, both the track and linkage technology and the pivot point technology are associated with disadvantages. Due to its limitation to a circular extension path, pivot kinematics only allow the setting of a desired target state when the flap is in position. The width and the form of the gap for the intermediate states during extension result automatically and cannot themselves be set. As a rule, the settable target setting is set such that in the fully extended state 110 it produces a predefinable result. In relation to intermediary extension states the width of the air gap often takes on a value that is below the optimum value, as a result of which the quality of the functionality of the flap may be reduced, and in particular the flow characteristics of the flap may be impeded (risk of confluent boundary layer flow). Due to the circular movement the shape of the gap in an intermediate state is partly divergent. Due to local deceleration of the flow speed this leads to separation of the boundary layer flow at the flap, with subsequent deterioration of lift performance, which in addition can also lead to the occurrence of vibration and noise. In a worst-case scenario this effect can lead to a range of intermediary flap positions not being useable at all.

Furthermore, in an advanced (high) degree of extension of the flap, irrespective of the kinematics used, boundary layer separation at the flap element can occur. This effect limits the efficiency of the flap, defines the maximum usable flap angle and causes vibration of the flap elements at high angles of extension.

There is a longstanding and unresolved need to provide an aircraft wing in which the lift performance of the wing is improved, and undesirable vibration and noise are prevented.

SUMMARY

This need may be met by an aircraft wing, by a method for operating an aircraft wing, and by the use of a pivotable trailing edge on a main wing of an aircraft, for adjusting the shape and the width of an air gap, with the characteristics according to embodiments of the present invention.

An aircraft wing has a main wing with a pivotable trailing edge and a lift-assisting flap on the rear of the wing. The lift-assisting flap may be coupled to the main wing and is designed such that in its retracted state it abuts the main wing and in an extended state it forms an air gap with the main wing. The pivotable trailing edge is pivotable in such a way that by pivoting the pivotable trailing edge the shape and the width of the air gap are adjustable.

A method for operating an aircraft wing including the steps of arranging a lift-assisting flap on the rear of the wing and coupling it to the main wing such that when activated it moves from a retracted state, in which the lift-assisting flap abuts the main wing, to an extended state, in which the lift-assisting flap forms an air gap to the main wing. The method includes hinging a pivotable trailing edge of the main wing such that pivoting the pivotable trailing edge changes the shape and adjusts the width of the air gap. Thus, the method is capable of changing the shape and width of the air gap to optimize performance characteristics of the flap and wing. The invention provides for the use of a pivotable trailing edge on the main wing of an aircraft, for adjusting the shape and the width of an air gap between the main wing and an extended lift-assisting flap on the rear of the wing by pivoting the pivotable trailing edge.

Thus, a pivotable trailing edge of the main wing, i.e. a pivotable element, may be provided on the rear end section of a main wing (i.e. of a wing carrier body affixed to a fuselage). The width and shape of an air gap between a lift-assisting flap (for example a Fowler flap) on the rear of the wing and the main wing is set to a desired value by means of rotating the pivotable trailing edge. The method may adjust the width of the air gap to be constant and free of any divergence. Thus, separation of the boundary layer flow at the flap may be suppressed, and any resulting undesirable vibration and undesirable noise may be considerably reduced or entirely avoided. It is thought, without being limiting in any way, that the high sensitivity of the air gap adjustment that may be achieved is due to the fact that only an end tip, in other words a small end region, of the main wing, namely the pivotable trailing edge of said main wing, may be set in relation to its positioning or angular position. In this way, the width of the air gap may be controlled very sensitively. Thus, only a finely adjustable end tip needs to be swivelled.

Real time control of the pivoting of the end tip may be used to set the air gap width by-means of targeted pivoting to and fro of the pivotable trailing edge throughout. In particular, the control may be provided during the entire process of extending the lift-assisting flap (in particular a Fowler flap) on the rear of the wing, from the retracted state to the extended state, for example. Thus, the aerodynamics of an aircraft are improved by moving a fine end tip on a trailing edge of a wing; in the example shown a movable shroud trailing edge. This makes it possible to optimize the aerodynamic design of high-lift systems. In one example, the system is used for optimising flaps with (circular arc) pivot-kinematics. Numeric calculations and wind tunnel experiments have shown that the aerodynamics of a wing comprising the pivotable trailing edge according to the invention are significantly improved compared to the known methods disclosed in the background section.

The movable trailing edge of the wing according to the invention can extend across the entire span of the lift-assisting flap and/or of the aircraft wing, or only across part of the width The pivotable trailing edge may be provided on an upper housing surface of the aircraft wing or may be attached to another movable component on the aircraft wing. For example a spoiler can comprise a movable trailing edge.

The trailing edge part of the wing according to the invention may be a flexible part that may be swivelled with the use of spring tension or may be operated with the use of an actuator.

When spring tension is used, for example the extendable device pushes against the movable trailing edge part of the wing, subsequently extends it from a retracted state to an extended state and leaves it in the extended state in a predefined position. A sprung plate or memory material could be an example of such a device.

The active movement of a movable trailing edge part of the wing according to the invention may be brought about in various ways, for example by using of mechanical or hydraulic actuation or by other means, for example the use of a bimetal strip that may be electrically activated.

When the flap on the kinematic extension path moves towards the rear, starting from the retracted position, and the air gap between the shroud and the upper surface of the flap opens, the movable trailing edge part of the wing may be extended downward thus changing the shape of the air gap in a predefinable way.

The system may be used either in the design of a new aircraft or may be retrofitted to already existing aircraft.

The angular position of an end tip of the main wing, i.e. of a pivotable trailing edge, may be set for controlling the gap width and/or the gap shape. It is preferred that the pivotable trailing edge is provided as a relatively small part of a larger component, because this reduces the complexity of control and makes is possible to achieve particularly fine control of the gap geometry, in particular in a simple extension mechanism In one example, the length of the movable trailing edge is at most 10% of the depth of the wing element to which said trailing edge is attached.

The position of the downward pivotable trailing edge sensitively affects fine adjustment of the gap width between the flap and the main wing, and thus has an advantageous influence on the quality of the flow characteristics at the flap in an intermediate position between a retracted state and a fully extended state. The divergence in the gap is reduced or even completely compensated for even in a circular extension path, due to the spatially adjustable movable trailing edge. Deceleration of the airflow in the surroundings of the flap is prevented so that undesirable boundary layer separation is suppressed and vibrations and reductions in performance are prevented.

Furthermore, commencement of boundary layer separation at the flap, which separation is an issue in particular in large extension angles of a flap, may be delayed using this system, which allows useful extension range of the flap to be expanded towards larger angles. Thus, the performance of the flap may be improved. The risk of vibration occurring at a high angle is reduced.

Below, some embodiments of the aircraft wing according to the invention are described. They also apply to the method for operating an aircraft wing and to the use of the invention.

The pivotable trailing edge may be designed such that pivoting of the pivotable trailing edge is capable of keeping the width of the air gap constant or convergent. With constant width of the air gap, boundary layer separation and other causes of undesirable vibration or noise are prevented.

The pivotable trailing edge may be designed such that pivoting of the pivotable trailing edge the width of the air gap during extension of the lift-assisting flap from the retracted state to the extended state keeps, at least at times, the air gap width or boundary layer constant or convergent. For example, a control unit may be provided, which, during extension of a Fowler flap, measures the corresponding gap and/or the width of the air gap and readjusts a drive for the pivotable trailing edge such that the width of the air gap is kept constant or convergent. If the trailing edge is small compared to the wing, then real time control may be achieved.

The pivotable trailing edge can extend along the entire span width of the Fowler flap. As an alterative, the pivotable trailing edge can extend along only part of the span width of the Fowler flap. This latter design may be particularly suitable for retrofit, if only a portion of a wing surface has a problem with separation and vibration caused during activation of a flap.

The pivotable trailing edge may be attached to a housing of the main wing. In particular, the pivotable trailing edge may be attached to an upper section of the housing of the main wing.

The pivotable trailing edge may be attached to a moveable element which is attached to a housing of the main wing. In particular, the pivotable trailing edge may be attached to a spoiler which itself is attached to a housing of the main wing. Apart from the normal spoiler function, for which the spoiler is extended and thus moved, the spoiler may be operated in the retracted state in such a way that at an end section of the spoiler, which end section is on the rear of the wing, the pivotable trailing edge is formed which may be hinged across a predefinable angular range, so that a predefinable air gap width may be set precisely.

The pivotable trailing edge may be hinged by using a spring element.

As an alternative, the pivotable trailing edge may be swivelled by using a drive device which can, for example, be an electrical drive device or a hydraulic drive device.

Moreover, a vane (slat) may be provided on the aircraft wing, wherein in the extended state of the lift-assisting flap said vane is arranged between the main wing and the lift-assisting flap. By using such a vane, an aircraft wing with a plurality of air gaps, in particular with two or three air gaps, may be formed.

In the extended state of the lift-assisting flap, several air gaps may be formed between the main wing and the lift-assisting flap.

The pivotable trailing edge is preferably designed in such a way that it capable of being attached to the main wing.

In one example, the lift-assisting flap on the rear of the wing is preferably a Fowler flap. A Fowler flap is an element which may be moved to the rear below the trailing edge and which may be set at an angle. In this way an air gap (or several air gaps) may be formed between the top side and the bottom side of the wing, as a result of which the airfoil curvature is increased. At the same time the effective wing surface may be increased.

As an alternative, the lift-assisting flap on the rear of the wing may be a slotted flap. In a slotted flap a control surface is tilted downward for extension. This movement simultaneously provides an air gap (or several air gaps), which admits (admit) air to the top side of the flap, thus preventing stalling. In a slotted flap the airfoil curvature is changed. The width of the air gap is adjusted in that the pivotable trailing edge is swivelled accordingly.

The invention may be applied not only to a Fowler flap or a slotted flap but to any lift-assisting flap in which in the extended state an air gap is created whose dimensions are to be controlled.

BRIEF DESCRIPTION OF THE DRAWINGS

The drawings illustrate some examples. The drawings in the figures are diagrammatic and not to scale. In some cases, identical or similar components in different drawings use the same reference numbers and characters in order to make comparisons between the drawings more readily discernable.

DETAILED DESCRIPTION OF EXEMPLARY EMBODIMENTS

The drawings and this detailed description provide some examples of the present invention, which should not be used to limit the scope of the claims that issue.

Figure 1:
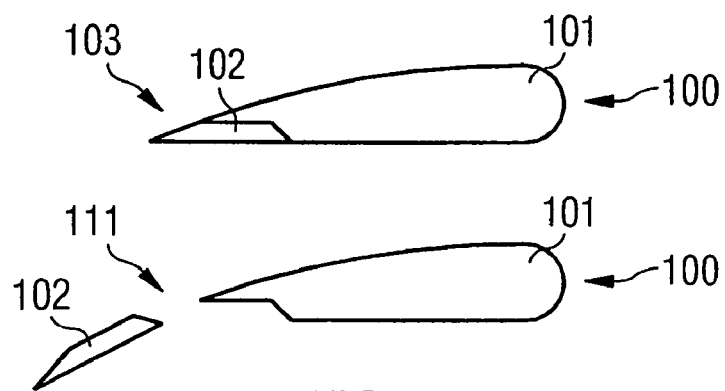
FIG. 1 illustrates a main wing with a Fowler flap according to prior art.
Figure 2:
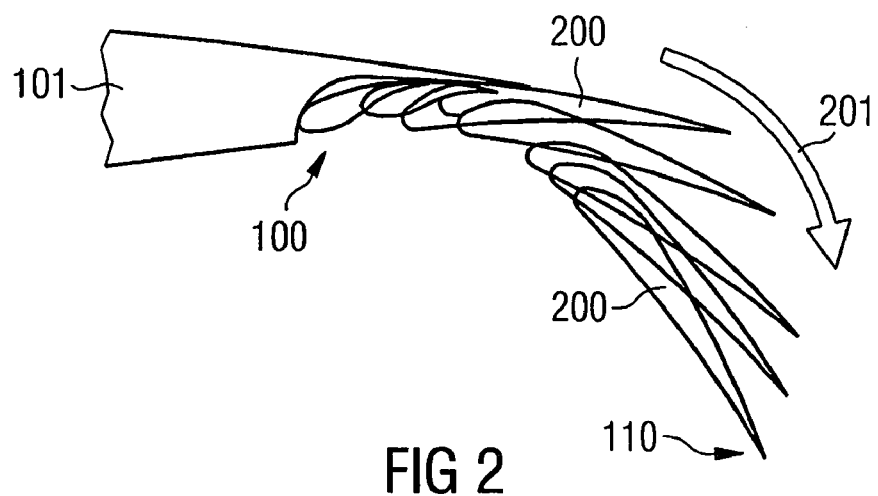
FIG. 2 illustrates another Fowler flap on a main wing according to the prior art.
Figure 3:
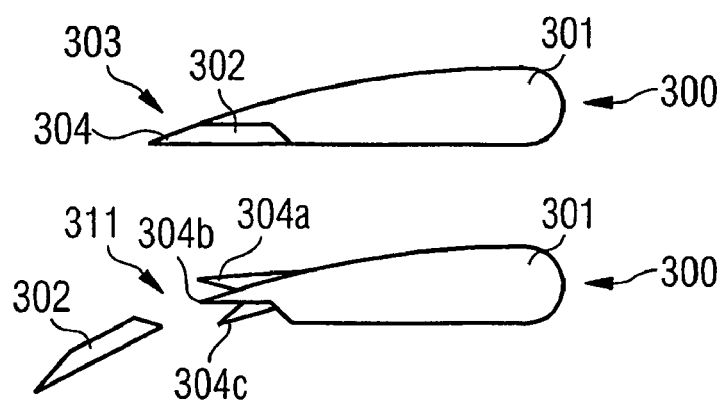
FIG. 3 illustrates an aircraft wing according to a first embodiment.

FIG. 3 shows an aircraft wing according to a first embodiment of the invention in a retracted state 300 in which a Fowler flap 302 abuts the main wing 301 and in an extended state 310 in which the Fowler flap 302 forms an air gap 311 with the main wing 301. The system comprises a main wing 301, a Fowler flap 302 and a pivotable trailing edge 304. The Fowler flap 302 is extendably attached to the main wing 301 (the corresponding coupling element is not shown in FIG. 3) and is equipped in such a way that in a retracted state 300 it abuts the main wing 301. In an extended state 310 it forms an air gap 311 with the main wing 301. The pivotable trailing edge 304 is attached to an end section. The end section may be on the rear of the main wing 301 and may be pivotable in such a way that by pivoting the pivotable trailing edge 304 the width of the air gap 311 is adjustable.

FIG. 3 shows the pivotable trailing edge 304 in a first pivoted state 304a, in a second pivoted state 304b and in a third pivoted state 304c. The second hinged state 304b shows the end tip in its rest position. The first hinged state 304a shows an excursion of the end tip towards the top when compared to the rest position of the end tip. The third pivoted state 304c shows an excursion of the end tip towards the bottom compared to the rest position of the end tip. Depending on the set pivoted state 304a to 304c, the width of the air gap 311 may be fine-adjusted, as a result of which undesirable airflow separations, vibration and noise in the aircraft interior are prevented. Furthermore, during the entire process of extension, i.e. during the transition from the state 300 to the state 310, the width of the air gap 311 may be directed or controlled.

The pivotable trailing edge 304 is pivotable in such a way that by pivoting the pivotable trailing edge 304, the width of the air gap 311 is held constant, namely during the transition of the Fowler flap 302 from the retracted state 300 to the extended state 310. The pivotable trailing edge 304 extends in a direction perpendicular to the drawing plane in FIG. 3 along the entire span width of the Fowler flap 302. The pivotable trailing edge 304 is attached to an upper housing end section of the main wing 301 and is pivotable by a hydraulic drive unit (not shown).

Figure 4:
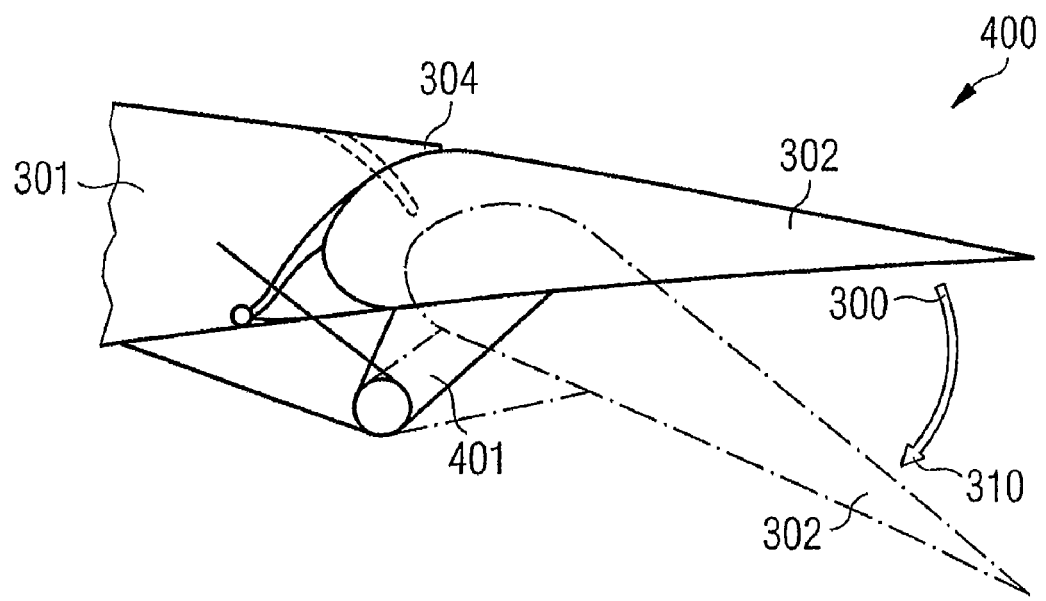
FIG. 4 illustrates an aircraft wing according to a second embodiment.
Figure 5A:
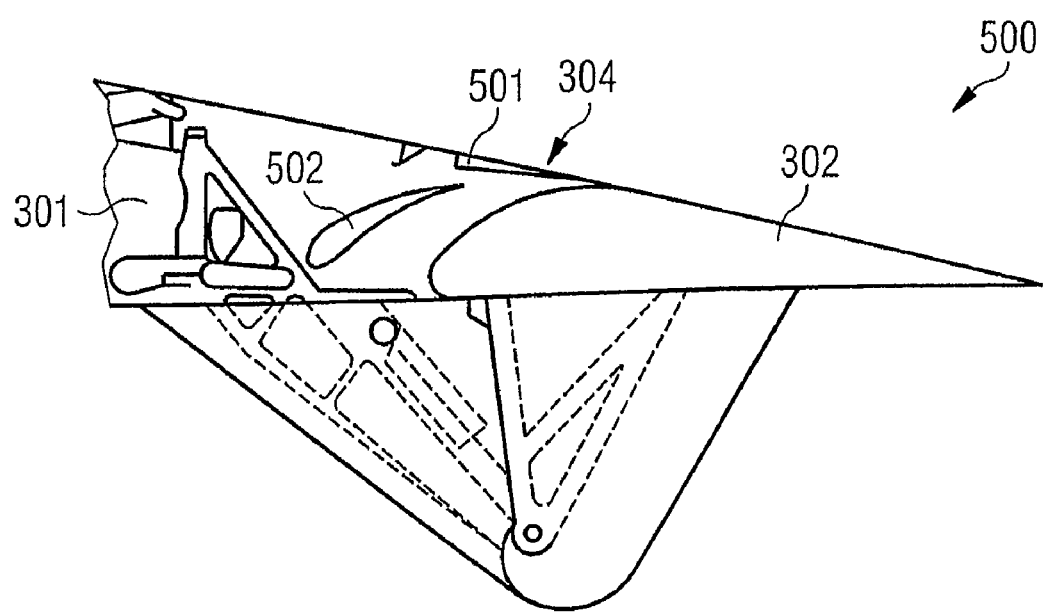
FIGS. 5A and 5B illustrate an aircraft wing according to yet another embodiment.
Figure 5B:
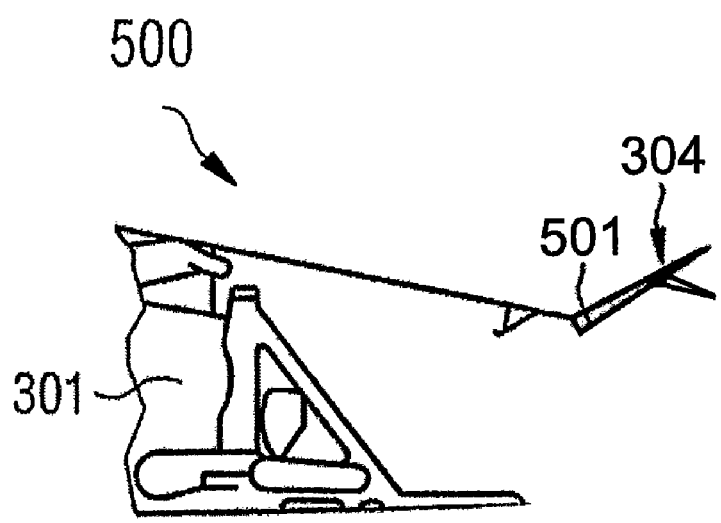

The aircraft wing 400 of FIG. 4 shows a so-called "slotted flap", in other words a Fowler flap 302, which at a transition from the retracted state 300 to the extended state 310 only generates a single air gap. By using of a pivotable arm 401, the Fowler flap 302, by retraction and subsequent pivoting, is brought from state 300 to state 310. In order to allow for a constant width or convergence of the air gap between the Fowler flap 302 and the main wing 301 during this transition, a pivotable trailing edge 304 of the main wing 301 according to FIG. 4, is slightly moved from the top towards the bottom, e.g., using an electronic motor control systems In the case of the aircraft wing 500 of FIG. 5A, a spoiler 501 is provided on the topside of an end section on the rear of the main wing 301. If required, the spoiler 501 may be extended to influence the aerodynamic properties of the aircraft wing 500. Attached to an end section of the spoiler 501 is a pivotable trailing edge 304, which in FIG. 5B is shown in two different operating positions.

FIG. 5 shows a configuration with a "double slotted flap" so that two air gaps may be created. To this effect a vane 502 is formed between the Fowler flap 302 and the main wing 301.

Figure 6:
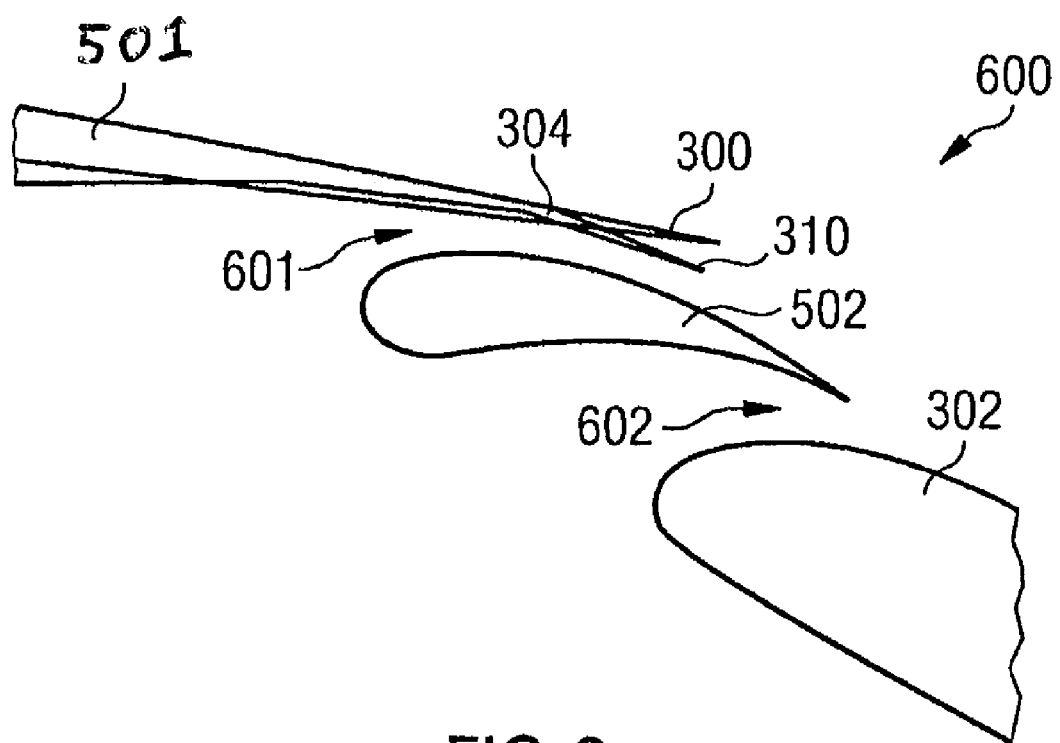
FIG. 6 illustrates an aircraft wing according to still another embodiment.

In a way similar to that of the aircraft wing 500, the aircraft wing 600 of FIG. 6 comprises a "double slotted flap" and has a configuration in which a main wing (not shown), a vane 502 and a Fowler flap 302 form a first air gap 601 and a second air gap 602, respectively. An end section of the main wing, spoiler 501, again comprises a pivotable trailing edge 304, which when the Fowler flap 302 makes the transition from the retracted state to an extended state is moved from state 300 to state 310. In other words, state 300 depicts a baseline state of the pivotable trailing edge 304, while state 310 shows an end state of the pivotable trailing edge 304 in a position of maximum excursion.

With reference to FIGS. 7A-8B, the aircraft wing 600 shown in FIG. 6, is used to show that the aerodynamic characteristics are significantly improved compared to the state of the art prior to the development of this example of the present invention. FIGS. 7A-8B show computational fluid dynamics (CFD) simulations, i.e. numeric flow simulations, in which the eddy viscosity in a region surrounding an aircraft wing is graphically shown. The CFD simulations of FIGS. 7A-8B have been calculated with an (unstructured) process using Navier-Stokes equations.

Figure 7A:
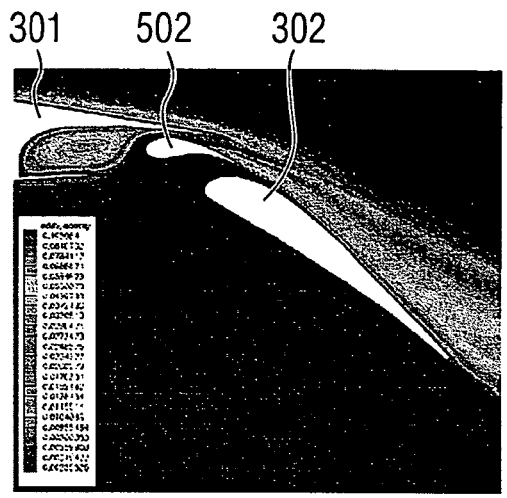
FIG. 7A to FIG. 8B show results of numeric flow simulations, illustrating the improved flow characteristics.
Figure 7B:
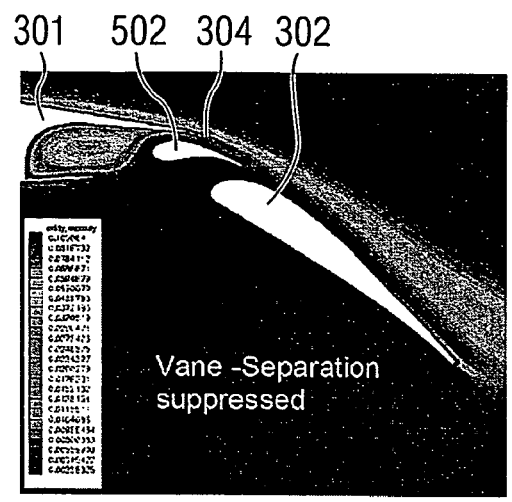
Figure 8A:
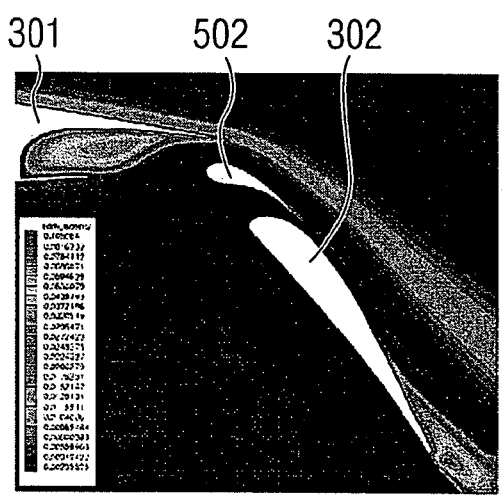
Figure 8B:
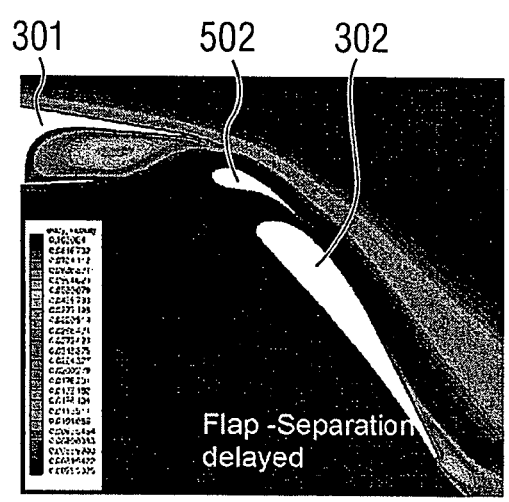

FIGS. 7A and 8A show the flow characteristics of an aircraft wing absent a pivotable trailing edge according to the present invention. FIGS. 7B and 8B show results with a wing including a pivotable trailing edge, which may be compared to FIGS. 7A and 8A to show the improved flow characteristics when providing a pivotable trailing edge 304.

For example, FIGS. 7A and 7B show that flow separation at medium angles of extension of the Fowler flap 302 (for example 35°) is strongly suppressed by the addition of the pivoting trailing edge, which would otherwise result for unmodified wings at such angles of flap extension. FIGS. 8A and 8B show the improvement of the flow characteristics in a region surrounding the flap 302 at a large angle of extension (for example 50°), which shows substantial improvements.

It should be noted that the term "comprising" does not exclude other elements or steps and the "a" or "an", does not exclude a plurality. Also elements described in association with different embodiments may be combined. It should also be noted that reference signs in the claims shall not be construed as limiting the scope of the claims.

What is claimed is:

1. An aircraft wing comprising:
a main wing having a housing;
a spoiler, wherein the spoiler is attached to the housing of the main wing;
a pivotable trailing edge, wherein the pivotable trailing edge is pivotably attached to the spoiler; and
a lift-assisting flap on the rear of the main wing;
wherein the lift-assisting flap is coupled to the main wing and is designed in such a way that in a retracted state, the lift-assisting flap abuts the main wing and in an extended state, the lift-assisting flap forms an air gap with the main wing; and the pivotable trailing edge is pivotable in such a way that by pivoting the pivotable trailing edge, a shape and a width of the air gap are adjustable.

2. The aircraft wing of claim 1, wherein the pivotable trailing edge is pivotable in such a way that by pivoting the pivotable trailing edge the width of the air gap is kept constant or convergent.

3. The aircraft wing of claim 1, wherein the pivotable trailing edge is pivotable in such a way that by pivoting the pivotable trailing edge the width of the air gap during extension of the lift-assisting flap from the retracted state to the extended state is at least at times kept constant or convergent.

4. The aircraft wing of claim 1, wherein the pivotable trailing edge extends along an entire span width of the lift-assisting flap.

5. The aircraft wing of claim 1, wherein the pivotable trailing edge extends along part of the span width of the lift-assisting flap.

6. The aircraft wing of claim 1, wherein the pivotable trailing edge is pivotable by using a spring element.

7. The aircraft wing of claim 1, wherein the pivotable trailing edge is pivotable by using a drive device.

8. The aircraft wing of claim 7, wherein the drive device is: an electrical drive device; or a hydraulic drive device.

9. The aircraft wing of claim 1, further comprising:
a vane which in the extended state of the lift-assisting flap is arranged between the main wing and the lift-assisting flap.

10. The aircraft wing of claim 1, wherein in the extended state of the lift-assisting flap, several air gaps are formed between the main wing and the lift-assisting flap.

11. The aircraft wing of claim 1, wherein the lift-assisting flap on the rear of the wing is a Fowler flap.

12. The aircraft wing of claim 1, wherein the lift-assisting flap on the rear of the wing is a slotted flap.

13. A method for operating an aircraft main wing, the method comprising:
attaching a pivotable trailing edge to a spoiler;
attaching the spoiler to a housing of the main wing, extendably;
moving a lift-assisting flap coupled to the main wing from a retracted state in which the lift-assisting flap abuts the main wing to an extended state in which the lift-assisting flap forms an air gap with the main wing; and
swivelling the pivotable trailing edge such that pivoting the pivotable trailing edge adjusts a shape and a width of the air gap.

14. A method comprising:
controlling the aircraft wing of claim 1, such that the pivotable trailing edge is pivoted and the shape and the width of the air gap between the main wing and the pivotable trailing edge is adjusted.

* * * * *